UNITED STATES PATENT OFFICE 2,618,623

SOLVENTS, SWELLING AGENTS AND/OR PLASTICIZERS FOR POLYMERS AND MIXED POLYMERS OF ACRYLIC NITRIL

Klaus Tessmar, Darmstadt, Germany, assignor to Röhm & Haas G. m. b. H., Darmstadt, Germany No Drawing. Application August 28, 1950, Serial No. 181,933. In Germany October 1, 1948

15 Claims. (Cl. 260—32.6)

The invention relates to solvents, swelling agents and/or plasticizers for polymers and mixed polymers of acrylic nitril, to compositions of matter including the same, and to methods of forming such compositions.

Polymers and mixed polymers of acrylic nitril have been regarded, for a long time, as being generally insoluble because they are insoluble in the most commonly used solvents. Recently, however, a number of substances have been found which are compatible with polyacrylic nitrils and which even yield clear, high viscosity solutions therewith, such substances being aqueous thiocyanate salt solutions, cyanohydrins, or N-substituted formyl amines.

It has been found that amino aceto nitril and its nitrogen substituted derivatives having the general formula R—NH—CH$_2$—CN wherein R is a member of a group consisting of hydrogen, methyl and cyanomethyl, can also advantageously be used as solvents and plasticizers for polyacrylic nitril and acrylic nitril mixed polymers. In contrast to prior art solvents these compounds have the advantage of possessing greater stability and better solvent and swelling power as well as more desirable physical properties.

Mixtures of such solvents with each other or with other solvents exert a much better solvent action than do the individual components despite the fact that some of the individual components, such, for example, as nitro-methane, may be poor solvents. Moreover, the mixtures have the advantage of possessing lower melting points and better precipitability than some or all of the individual components.

The solutions can be utilized for preparing fibers, threads, films, and, for example, in the production of multilayer safety glass, hose, coatings, adhesives, etc. High boiling and difficultly volatile derivatives or mixtures of the same are suitable as plasticizers for the aforesaid polymers.

The invention will be more readily understood by reference to the following specific examples, which are intended as illustrative of the inventive thought rather than as limiting the invention to the specific details set forth therein. For example, the relative proportions of the polymers or mixed polymers and solvents, swelling agents or plasticizers may be varied within wide limits without departing from the spirit of the invention, the solvent being preferably, though not necessarily, used in excess of the polymer or mixed polymer.

Example 1

15 parts of polyacrilic nitril (specific viscosity η sp/c=.17 measured in glycolic acid nitril as the solvent) are stirred with 85 parts of amino aceto nitril at 35°. After thirty minutes a light yellow viscous solution is obtained which does not gel at room temperature. It can be spun by means of the wet-spinning process, for example, into spinbaths of water or mixtures of water and amino aceto nitril or glycerine. Dry-spinning thereof is also possible.

Example 2

Iminodiacetic acid dinitril:

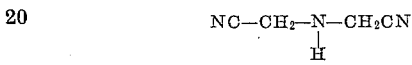

is melted at 80° and kneaded with a mixed polymer of ninety parts acrylic nitril and ten parts methacrylic acid butyl ester in the ratio of 80:20. A light brownish, highly viscous mass is obtained out of which a tough whitish film is precipitated when treated with water. The dissolution temperature may be reduced by adding other solvent and swelling agents such as amino aceto nitril, chloraceto nitril, nitromethane, glycolic acid nitril, N,N-dimethyl formamid, etc.

Example 3

N-methyl amino aceto nitril:

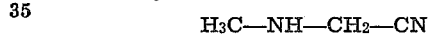

serves, at 100°, to dissolve a mixed polymer of acrylic acid nitril and styrene in the proportion of 70:30 to form a clear, viscous reddish solution which solidifies at room temperature to a translucent gel.

I claim:

1. A new composition of matter comprising (1) a polymer of acrylic nitril and (2) a substance having the general formula

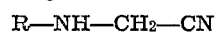

wherein R is a member of a group consisting of hydrogen, methyl and cyanomethyl.

2. A composition as set forth in claim 1 where-

3. A composition as set forth in claim 1 wherein substance (1) is a copolymer of acrylic nitril and a different substance containing the group $CH_2=C<$.

4. A composition as set forth in claim 1 wherein substance (2) includes amino-aceto-nitril.

5. A composition as set forth in claim 1 wherein substance (2) is used in excess of substance (1).

6. A composition of matter comprising (1) a polymer of acrylic nitril and (2) a solvent for (1) which includes amino-aceto-nitril.

7. A composition of matter as set forth in claim 1 wherein substance (2) comprises a solvent mixture for (1) including a substance having the general formula set forth in claim 1.

8. A composition as set forth in claim 1 wherein substance (1) is formed from at least 70% acrylonitril.

9. A composition as set forth in claim 1 wherein substance (1) is formed from 70 to 100% acrylonitril.

10. A composition as set forth in claim 1 wherein substance (2) comprises a solvent mixture for (1) which includes amino-aceto-nitril and other components.

11. A composition as set forth in claim 1 wherein substance (2) comprises a mixture of solvents having the generic formula set forth in claim 1.

12. A composition of matter comprising (1) a polymer of acrylic nitril and (2) amino-acetonitril.

13. A composition of matter comprising (1) a copolymer of acrylic nitril and methacrylic acid butyl ester and (2) a solvent comprising iminodiacetic acid dinitril.

14. A composition of matter comprising (1) a copolymer of acrylo-nitril and styrene and (2) a solvent comprising N-methyl amine acetonitril.

15. A method of preparing the composition set forth in claim 1 which comprises mixing substances (1) and (2) at elevated temperatures.

KLAUS TESSMAR.

REFERENCES CITED

The following references are of record in the file of this patent:

UNITED STATES PATENTS

| Number | Name | Date |
|---|---|---|
| 2,517,544 | Cresswell | Aug. 8, 1950 |